United States Patent Office 2,999,293
Patented Sept. 12, 1961

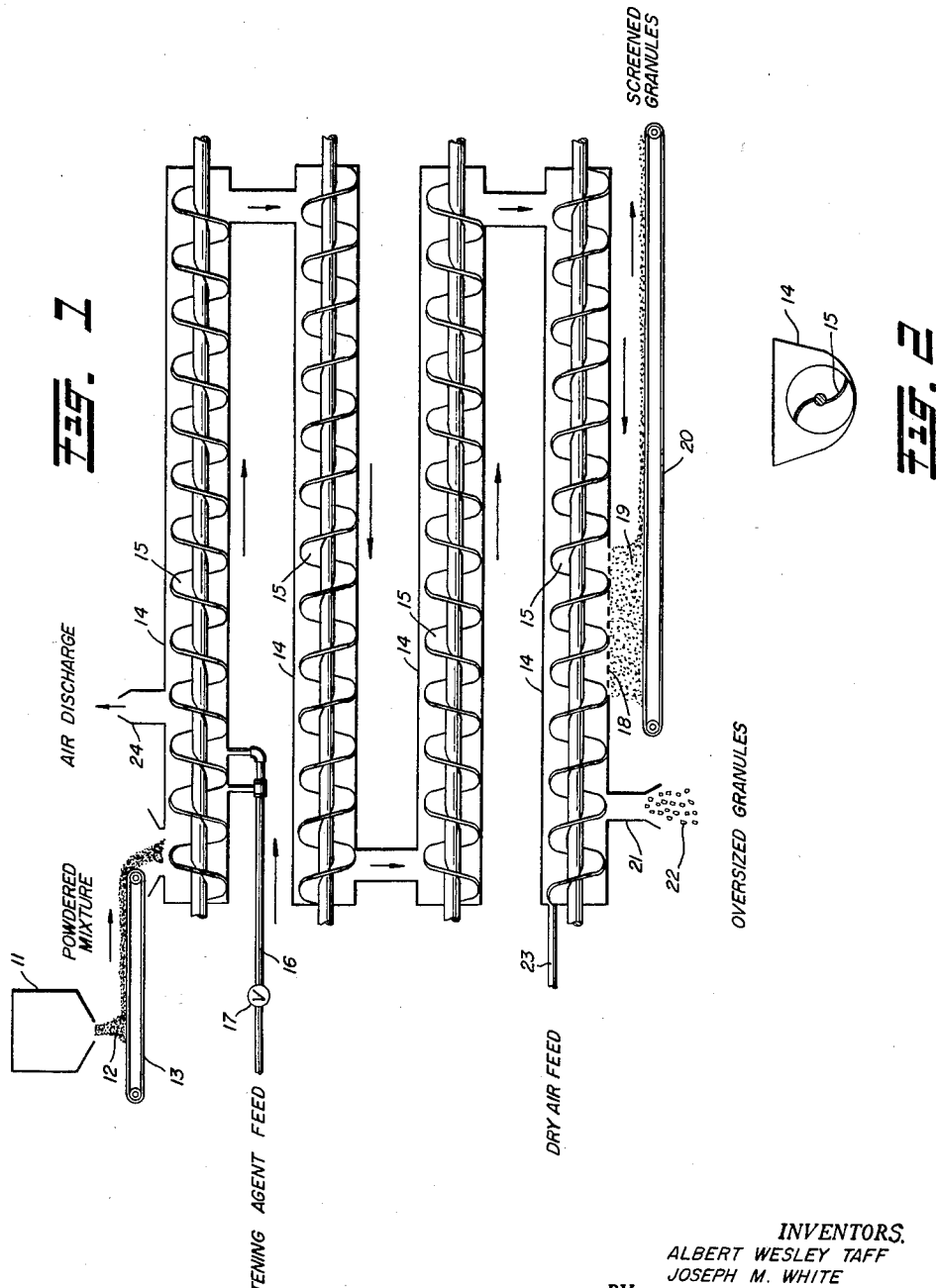

2,999,293
PROCESS OF GRANULATING EFFERVESCENT MATERIALS
Albert Wesley Taff, Glen Burnie, and Joseph M. White and Robert E. Kolb, Baltimore, Md., assignors to Warner-Lambert Pharmaceutical Company
Filed Sept. 12, 1957, Ser. No. 683,450
9 Claims. (Cl. 25—156)

This invention relates to the production of granular materials and relates more particularly to a novel wet granulation process wherein granulations are prepared in a continuous manner from a mixture of dry, powdered ingredients.

An object of this invention is the provision of a new, novel and improved wet granulation process for the production of discrete granular particles from a mixture of ingredients which are initially present in dry, powdered form.

Another object of this invention is the provision of a new and novel wet granulation process for the production of granulations which are particularly adapted to be employed in the preparation of compressed shapes such as tablets, for example, or other shapes by compression molding operations involving the use of punches and dies for the shaping of said granulations.

Yet another object of this invention is the provision of a new and novel wet granulation process for the production of stable granules of effervescent compositions.

Still another object of this invention is the provision of a new and novel wet granulation process for the continuous production of pharmaceutical granulations wherein said granules may be produced in controlled and substantially uniform particle sizes and which are particularly adapted for tablet making by compression molding procedures.

A further object of this invention is the production of granules of effervescent compositions which are not only readily soluble in aqueous media with the production of the desired effervescence but which are, in addition, highly stable, resistant to physical attrition and which may be readily compressed to tablet form.

Other objects of this invention will appear from the following detailed description.

In compression molding operations involving the use of finely-divided powdered compositions, the usual procedure involves feeding a granulation of the dry, powdered ingredients to the compression molding machine in which the shaping of the composition is effected. Successful compression molding requires a material that is properly shaped physically, is dry and free-flowing and possesses sufficient binding or adhesive qualities to cohere when compressed. In addition, successful compression molding also requires a material which will not stick to the punches and dies which are used to shape the material. Materials in the form of finely-divided powders rarely possess all of these qualities. One very important factor which precludes the use of finely-divided powders in successful compression molding operations is that finely-divided powders readily entrap air which enters the cavity of the compression molding machine along with the powdered charge. While the powder will tend to hold its shape under the force applied during compression, as soon as the pressure of the punch and die are released the shaped tablet or other compressed form is easily split or may even be shattered by the expansion of the entrapped air. These disadvantages in the use of powders are eliminated by the proper granulation of the powdered mixture being employed. Granulations where the particle size is from 20 to 30 mesh are a desirable size for compression molding.

The formation of granules by wet granulation procedures is an operation which is widely employed in the pharmaceutical industry as a preliminary step in the preparation of compositions suitable for compression molding in tablet making. The granulation procedures heretofore employed are particularly difficult and tedious because of the fact that a great number of ingredients are commonly utilized in a single formulation which not only necessitates many mixing operations but frequently requires the preparation of numerous separate granulations. Further, many formulations are quite sensitive to processing conditions where some work is applied to them as in forcing the mixture through screens during granulation. In many instances, these formulations exhibit little tolerance to the pressures required to force them through the screens, and as pointed out above, even ordinary pressures easily convert these mixtures to a sticky solid mass which is often impossible to force through the screens even with the application of rather high pressures.

These granulations include not only the active therapeutic components but binders, diluents, disintegrating agents and lubricants, all of which are essential for the production of satisfactory compressed tablets which are strong, firm and resistant to attrition and which will dissolve or disintegrate readily when taken orally. In addition, compressed tablets are frequently coated after being shaped and such tablets must also have the necessary characteristics to make them amenable to the coating operation.

One of the more difficult problems in the pharmaceutical industry, for example, is the production of granular effervescent mixtures and the production of strong and stable effervescent tablets from such granular mixtures. In the production of such effervescent granules or tablets for the oral administration of therapeutic compounds, the basic components consist of an alkali metal carbonate or an alkali metal bicarbonate, usually sodium bicarbonate or potassium bicarbonate, or even ammonium bicarbonate, combined with an acid, such as tartaric acid, citric acid or malic acid, or a mixture of these acids. To this basic effervescent mixture, various therapeutic and flavoring ingredients may be added depending upon the specific type of product desired. When the effervescent mixture is added to water, the acid present reacts with the sodium bicarbonate in the mixture and the release of the gaseous carbon dioxide formed as a product of this reaction, produces a vigorous effervescence.

Since effervescent granules or tablets consist of an intimate mixture of components which are highly reactive in the presence of moisture, it is apparent that the control of humidity is an extremely important factor in the production of commercially acceptable and stable effervescent granules or tablets. Uncontrolled humidity or prolonged exposure to moisture, or even excessive moisture content, will cause the sodium bicarbonate and the acid to react. Since this reaction not only forms sodium citrate and carbon dioxide but water as well, the decomposition reaction is progressive. As a consequence, the ordinary wet granulation procedures, described above, cannot be utilized when dealing with effervescent mixtures. In fact, the ordinary wet granulation procedure would result in the complete decomposition of the product, and the lively effervescence which is ordinarily obtained when a well-formulated and stable commercial product is added to water is completely lost.

Various methods and various components have been suggested for the preparation of effervescent granules and for the preparation of tablets from these granules. One method utilizes a mixture consisting of sodium bicarbonate, anhydrous citric acid and powdered sugar. In accordance with this method, the mixture is first dampened with aqueous ethyl alcohol, and the mass then granulated and dried prior to tableting. One of the major objections to this method appears to be the fact that not only is considerable handling required in granulation but that excessive decomposition of the reactants takes place during drying. An alternative which has been suggested to obviate certain of the disadvantages noted is to granulate the sodium bicarbonate and acid separately and to then combine a lubricant and binder with the respective granulations prior to tableting. For many practical reasons, variations in the granulations produced and which may occur in combining the granulations do not lead to an entirely satisfactory product which conforms to the standards which are required for commercial application.

An alternative process, and one that is more widely used is the fusion method. By this method, sodium bicarbonate and monohydrated citric acid are combined in the required formula proportions together with the desired flavoring and medicinal ingredients and, on heating the mixture in wide, flat trays or pans, the water of crystallization of the citric acid is liberated. The water thus liberated converts the entire mixture to a pasty mass which is then broken down into coarse granules. The coarse granules are classified and dried and, after the larger particles are further broken down to the desired particle size, the entire granular mass is slowly and carefully dried. This method not only requires a great deal of heating and drying capacity but it also produces a product composed of granules of widely-differing particle size. In breaking down the initial fused mixture as well as the coarse granules which are first obtained when the fused mixture is broken up, an appreciable proportion of the product is reduced to a particle size much below that desired and, in fact, much of it is little larger than a coarse powder in particle size. Since the process involves the reduction in size of a mass of fused material, the production of these powdery fines is substantially unavoidable. However, as stated above, they do represent considerable losses in material and, when the effervescent formulation is marketed in granular form, as many are, an excessive proportion of fines poses a serious economic and packaging problem since widely-varying volumes will represent an equal weight of the product.

We have now found that the above and other difficulties in the wet granulation processes heretofore employed for the preparation of granules from finely-divided powdered compositions may be overcome and granules of controlled particle size may be obtained in a continuous manner by processing finely-divided powdered mixtures which are to be converted into granules by a new and novel granulation process.

In accordance with the novel process of our invention, said powdered mixtures may be converted into discrete granular particles by the steps which comprise passing the powdered mixture into a treating zone, introducing a controlled amount of a liquid into the powdered mixture in the treating zone so as to wet the powder locally and form a plurality of small, wetted masses within the large powdered mass, then subjecting the resulting mixture to mixing, tumbling and cutting action whereby the small wetted masses within the larger powdered mass are broken up into smaller wetted nuclei and continuing the mixing and tumbling action so as to cause the remaining dry powder to adhere to the smaller wetted nuclei.

As the mixing and tumbling continues, the moisture in the smaller wetted nuclei diffuses by capillary action to the surface of these nuclei. The moisture present reaches the surface of these nuclei through the dry, powdered material which had previously adhered to the original wetted surface. In this way, the dry, powdered surface material is moistened thus enabling the resulting moist granules to pick up further dry, powdered material thus producing an increase in the particle size of the granules formed. As the mixing and tumbling process continues, substantially all of the dry, powdered material present is taken up by the moist surfaces of the granular particles eliminating the problem of fines and producing granules of substantially uniform particle size. The discrete granular particles formed by this novel process may then be dried if it is desired to remove the liquid used as the moistening agent.

Where the moistening agent is water and granules of an effervescent composition are being formed, it is of importance to remove the water present in order to minimize any decomposition which would result because of the presence of the water. The water may be removed, at least in part, by using a treating zone which is partly or completely enclosed and passing a stream of air of controlled temperature and humidity through all or part of the zone in which the powdered mass is moving during the mixing, tumbling and cutting operation comprising our novel granulation process. This expedient causes the particles to fall through the stream of air and a substantial amount of the moisture present may be readily removed at this stage of the process if it is so desired. By passing the formed granules through a suitable drier, the granular particles may be completely dried. In this form they are highly stable when precautions are taken to store them under moisture-free conditions.

Where the moistening agent is a non-aqueous liquid such as an organic plasticizer, which is advantageously employed in the compression molding of plastic mixtures, it is frequently desired to retain the plasticizer in the structure in order to impart flexibility and increased impact strength to the molded article.

The wetting agents used in pharmaceutical formulations may merely be water or an alcohol such as ethyl alcohol, as pointed out above. In addition, the wetting agent may contain a binder and may be an aqueous solution of gelatin, a thin starch paste, an aqueous solution of glucose or corn syrup or an aqueous solution of sugar. The binding agent may be added to the mixture in dry form and, on addition of the wetting agent, the adhesive qualities of the binding agent solution are exerted on the mixture. Aqueous solutions of gelatin are also useful and these are commonly employed as 10 to 20% by weight solutions. The concentration of glucose or sugar solutions may be from 25 to 50% by weight, but this concentration is a matter of choice depending upon the degree of binding action desired.

Pharmaceutical formulations which are granulated and then formed into tablets by compression molding usually contain various other components including substances which act to disintegrate the tablets when added to water, and the disintegrants commonly employed are either corn starch or potato starch. The use of a starch paste as a binding agent has little effect on the disintegrating characteristics of the final tablets obtained and to impart desirable disintegrating characteristics it is preferable that where starch is used as a disintegrating agent it is added in part to the powdered mixture being granulated and the remainder then added to the granules themselves after they are formed.

Diluents are also commonly employed and our novel wet granulation process is quite satisfactory in the preparation of granules from powdered mixtures which contain diluents such as dry starch, lactose, powdered sucrose, kaolin, dicalcium phosphate and mannitol, for example. Lubricants such as stearic acid, magnesium stearate, sodium stearate, calcium stearate, hydrogenated vegetable oil, white mineral oil, talc, sodium benzoate and sodium chloride, may also be employed, but these lubricants are normally added to the granules after formation, particularly when the granules themselves are not amenable to compression molding without sticking to the dies and punches used for forming the tablets.

The novel process of our invention is particularly valuable for the production of effervescent granules of controlled particle size. These granules are readily obtained from the usual mixture of dry, powdered components, including sodium bicarbonate and an acid, such as citric acid or tartaric acid, if water in the form of droplets is continuously added to such dry mixture while it is being agitated with a mixing, tumbling and cutting action, and the moist particles which are produced by the resulting limited reaction are then continuously dispersed as nuclei throughout the otherwise dry mixture. By providing the aforementioned mixing, tumbling and cutting action to the locally moistened or wetted mixture, the small dampened particles formed act as nuclei and acquire an adherent coating of the dry components surrounding them. By carefully controlling the amount of water added to the mixture to avoid excessive decomposition, while applying the desired mixing, tumbling and cutting action to the mass, discrete granules of the effervescent mixture are built up in a uniform fashion from these small nuclei. Because of the fact that by our novel process these granules are obtained by the building up of layers of dry powder with the moist nuclei serving as the base, a substantially uniform particle size for these granules is readily achieved.

An important and distinguishing feature of the novel granulation process of our invention is that during the granulation process, the granulating action is achieved by the mixing, tumbling and cutting action provided without the application of any compressive force either to the initial dry powdered mixture or to the wetted nuclei at any stage of the granulation process. This is in marked contrast to prior granulation processes where granulation is achieved by the application of compressive force to a mixture and the actual granule formation is achieved by the extrusion of the mixture through screens.

In our novel process, by a suitable balance of the several variable factors involved, including the amount and rate of liquid addition to the original mixture of dry, powdered components, as well as the degree, vigor, quality and form of the mixing, tumbling and cutting action, substantially all of the dry, powdered mixture is taken up in the final granulated form and the problem of fines is completely eliminated. Solid, firm and stable granulations which are highly resistant to attrition are formed and these may be readily obtained by our novel process in uniform particle sizes varying from 20 up to about 5 mesh, as desired.

While, in forming effervescent granules in accordance with our novel wet granulation process, either citric acid or tartaric acid or a mixture of these acids may be employed in combination with sodium bicarbonate to prepare the basic formulation for said effervescent granules, we preferably employ citric acid and, more particularly, preferably employ citric acid in its anhydrous form. With anhydrous citric acid, the amount of water to be removed in drying the final granules is appreciably reduced since the hydrated form of citric acid contains one mol of water for each mol of acid. This water is, however, not available for granulation in our novel process, since it is present as bound water of crystallization. While the water added to the mixture must be substantially entirely removed in order to form desirably stable granules, the water of crystallization serves no useful purpose otherwise in our process and it is only the free or uncombined water which serves to form the nuclei from which the granules are formed.

The precise stoichiometric ratio of anhydrous citric acid to sodium bicarbonate in a basic effervescent formulation based upon these active components is 192 parts by weight of anhydrous citric acid to 252 parts by weight of sodium bicarbonate, with three mols of sodium bicarbonate being necessary to neutralize each mol of citric acid. In the case of tartaric acid, only two mols of sodium bicarbonate are necessary to neutralize each molecule of tartaric acid. The citric acid may be employed in excess, and this may be an excess of 2 to 50% by weight of that theoretically required. An excess of citric acid imparts a pleasant and somewhat tart taste to the formulation. Aside from the consideration of taste, the use of an excess of citric acid is not necessary and entirely satisfactory formulations are obtained where the exact stoichiometric ratio is employed. An excess of 1 to 5% by weight of the alkali may also be utilized.

The amount of water or other liquid added to the dry, powdered mixture of ingredients when preparing granules will vary, and generally from about 1 to 3 parts by weight of water for each 100 parts by weight of the dry mixture is satisfactory.

While aqueous solutions of binding agents may be employed in the manufacture of effervescent granules, water alone is preferred and it is the amount of water added to the mixture of sodium bicarbonate and acid which is the important factor in properly forming the granules in accordance with our invention. An excessive amount of water is obviously undesirable since the components react in the presence of water not only to form carbon dioxide and sodium citrate but to form further amounts of water, as well. If the mixture is wetted too freely, the reaction will proceed to such a degree that the granulated product ultimately obtained will not contain sufficient unreacted acid and sodium bicarbonate to yield the desired lively effervescence. The water is preferably added in the liquid phase and, to achieve the desired control and dispersion through the mixture, it is most advantageously metered to the mixture in the form of small drops which are preferably introduced at some convenient point within the body of the mass of the powdered components from which the granules are to be formed.

Thus, for example, in carrying out our novel wet granulation process, an intimate mixture of the powdered components is passed along a trough by means of a helical or screw conveyor, or by a segmental or interrupted screw type of rotating conveyor and the liquid, such as water or an aqueous solution of a binding agent is introduced in the form of small drops, the water being passed into the mixture through fine orifices, which are conveniently located beneath the churning, powdered mass. In the case of effervescent compositions the introduction of the water in liquid form causes the acid and sodium bicarbonate to react locally where they are brought into solution with the result that carbon dioxide, sodium citrate and water are formed. The carbon dioxide generated acts to expand the locally wetted mixture at the point of reaction and this expansion acts to produce an agglomeration of wetted nuclei. The further movement of the resulting mass of dry and slightly wetted nuclei along the trough together with the mixing, tumbling and cutting action imparted to the mixture by the conveying means provided in the trough which comprises the treating zone, breaks the frothy reaction product into relatively small particles. The dry components adhere to these moist particles or nuclei and this adherent action acts to form the desired granules. As brought out above, the moisture in the initial nuclei migrates to the surface of the nuclei by capillary action thus wetting the dry components on the outer surface and enabling additional dry components to be picked up by the newly moistened surface. The further mixing and tumbling action produced by the conveying means gradually causes substantially all of the powdered material to be picked up in this way as a coating or layer on the moist nuclei and granules in the desired particle size are thus obtained by suitable control of the variables pointed out above.

During the mixing and tumbling action imparted to the moist nuclei in the dry, powdered mass in the case of effervescent mixtures, it has been found that the passage of air at a temperature of 35 to 50° C. and at a relative humidity of 10 to 40% over and through the falling particles is highly advantageous. This step aids in reducing the moisture content of the formed granules as they leave the processing zone, prior to a final drying stage.

In the drawing:

FIG. 1 illustrates in simplified schematic form suitable apparatus for carrying out the granulation process of our invention; and FIG. 2 is a detailed view of one of the conveying troughs of the apparatus shown in FIG. 1 illustrating the location of the screw conveying element therein.

Referring now to the drawing, a stream of powdered mixture 12 is delivered from a feed hopper 11 onto a conveyer 13 which deposits the powdered mixture into a trough 14 fitted with a continuous conveying screw 15. Four such troughs 14 are provided, with the pitch of their respective screws 15 being arranged such that the powdered mixture is conveyed through the troughs in series in the manner indicated by the directional arrows. A suitable moistening agent is introduced through a conduit 16 controlled by a valve 17 into the bottom of the uppermost trough 14 immediately after the point of introduction of the powdered mixture. A screen 18 is provided at the bottom of the lowermost trough 14 through which passes screened granules 19 onto a conveyer belt 20. Oversized granules 22 are discharged from the lowermost trough through a discharge conduit 21. Dry heated air is passed into the lowermost trough through a conduit 23. The air passes countercurrent to the flow of solids through the troughs and is exhausted from the uppermost trough through air discharge conduit 24.

While we have directed the description of our invention to the production of effervescent granules from a basic formulation whose essential ingredients are sodium bicarbonate and citric acid, for example, the effervescent granules so formulated will normally contain various therapeutic agents such as bromides, for example, or various antipyretics or analgetics such as aspirin, phenacetin, acetanilid or caffeine or codeine. The effervescent granules may also contain any desired combination of these or other similar active ingredients where it is desired to administer these ingredients in an effervescent dosage form. To incorporate these active components in the effervescent granules, the desired components are added in suitable formula proportions to the mixture of sodium bicarbonate and citric acid. Flavoring oils or sweeteners, or both, may also be incorporated in the mixtures which are granulated in accordance with our novel process or the flavoring material may be added subsequently.

In order further to illustrate our invention but without being limited thereto the following examples are given:

*Example I*

The following dry, powdered ingredients are thoroughly mixed in the proportions given, the particle size of each of the respective materials being as follows:

|  | Pounds | Mesh |
|---|---|---|
| Anhydrous Citric Acid | 107 | 100–200 |
| Sodium bicarbonate | 133 | 100–300 |
| Sugar | 23 | 100–200 |
| Acetanilid | 9 | 100–200 |
| Sodium bromide | 18 | 40–100 |
| Caffeine | 2.75 | 100–200 |

This powdered mixture is introduced by a suitable feed mechanism, such as a screw conveyor, into a series of closed and vertically staggered troughs, each trough being provided with mixing blades set upon a rotating shaft, the level or depth of the powder in each trough being so maintained that each trough is only partly filled, leaving the drive shaft exposed and the mixing blades only partly covered. The angular disposition relative to the drive shaft and the rotation of the mixing blades is so adjusted that their motion readily carries the powdered mixture forward while at the same time imparting a sifting, tumbling and cutting action to the moving mixture. The system employed herein comprises a series of four troughs, each discharging by gravity into the other and each being about ten feet long, thus providing a total movement for the mixture of about forty feet. Preferably as in the usual good mixing practice, the mixing blades should sweep close to the lowermost point in the trough so that all portions of the powder mixture will be subjected to the above sifting and tumbling action. The mixing blades preferably are so arranged that they cut through the mixture without the application of compressive force. The lowermost trough is provided with a base of screen material having the desired mesh so that the granules formed as the mixture passes through the trough may be readily classified. Adjacent to the point at which the powdered mixture is introduced into the first trough, and set below the normal level at which the powder depth is maintained are a plurality of tubes of narrow diameter through which the desired quantity of water is introduced as the powdered mixture moves past. The rate of water addition is adjusted to the rate at which the powdered mixture is passed through the trough and is preferably such that for a feed rate of about 2.5 pounds per minute of the powdered mixture entering the mixing trough about 0.076 pound of water per minute are introduced. The length of the trough and the rate at which the mixture passes through the trough are adjusted so that the total dwell of the material in the troughs is about twenty minutes. Air at a relative humidity of about 20% is passed countercurrently through the several troughs. The sifting, tumbling and cutting action of the mixing blades on the moistened powder acts to convert the moistened powder to discrete, firm granules which finally pass to the screening operation described. The initially screened granules are then introduced into a dryer where they are maintained at a temperature of 150° F. for 60 minutes. The granules which are formed are substantially uniform in size and the size distribution is such that approximately 46% by weight remain on a 5 mesh screen, about 46.6% on 10 mesh, 36.5% on 20 mesh and 12.3% through 20 mesh. The granules are firm and stable, they flow easily and are highly resistant to attrition.

*Example II*

The following dry, powdered ingredients are mixed in the proportions given, the particle size of each of the several ingredients being from 100 to 200 mesh:

|  | Pounds |
|---|---|
| Activated aluminum hydroxide gel | 286 |
| Magnesium trisilicate | 536 |
| Soluble saccharin powder | oz... 15 |
| Powdered sugar with starch 3% | 420 |
| Corn starch | 50 |
| Calcium phosphate tribasic | 4 |

The process steps described in Example I are followed for converting the above mixture into granules, with the exception that the rate of feed of the powdered mixture to the granulating apparatus is four pounds per minute and the wetting agent employed is a 37% by weight aqueous sugar solution. This sugar solution is fed beneath the surface of the powdered mixture at a rate of about 397 cc. per minute.

The granules formed in this run are then dried in a suitable dryer for two hours at 155 to 190° F. The screen analysis of the granules shows a distribution similar to that of the granules formed by the process of Example I.

*Example III*

The following dry, powdered ingredients are mixed in the proportions given below, the particle size of the ingredients being from 100 to 200 mesh:

|  | Pounds |
|---|---|
| Citric acid anhydrous | 178 |
| Sodium bicarbonate | 97 |
| Sodium cyclamate | 19 |
| Sodium saccharin | 4 |
| Carboxy methylcellulose | 1 |

The process steps of Example I are followed in carrying out the granulation of this mixture. The rate of feed of the mixture is maintained at three lbs. per minute and water is added as the wetting agent at a rate of 13.5 cc. per minute. A ten mesh screen is provided on the lowermost trough. The dwell of the material being granulated is fifteen minutes from the point where the water is introduced until the granules reach the ten mesh screen. The granules passing through the ten mesh screen are dried at 160° F. for forty-five minutes. The size distribution is the following: about 5.0% on 10 mesh, 25.0% on 20 mesh, 60.0% on 40 mesh and 15% through 40 mesh. This distribution indicates the very high order of uniformity in the granulation so produced.

It is understood that the foregoing detailed description is given merely by way of illustration and that many variations may be made therein without departing from the spirit of our invention.

Having described our invention, what we desire to secure by Letters Patent is:

1. In a process for the production of an effervescent composition comprising preparing a powdered mixture which is reactive in aqueous solution to produce effervescence and forming said mixture into discrete granular particles, the improvement which comprises feeding said powdered mixture to an elongated treating zone in which it is conveyed while being subjected to a mixing, tumbling and cutting action, continuously adding water beneath the surface of said powdered mixture within said treating zone at a point adjacent to the point at which said powdered mixture is fed to said treating zone in an amount of about 1 to about 3 percent of the weight of said powdered mixture being fed per unit of time to dampen said powdered mixture locally and to cause a localized effervescent reaction to take place, further subjecting said locally reacted mixture to said mixing, tumbling and cutting action whereby the aggregations of dampened particles formed by said localized effervescent reaction are broken up into small dampened nuclei, and continuing the mixing and tumbling of the resulting mixture so as to cause the powdered mixture remaining to adhere to said damp nuclei and to build up discrete granular particles.

2. A process in accordance with claim 1 wherein said elongated treating zone is enclosed and a current of air having a temperature of about 35 to about 50° C. and a relative humidity of about 10 to about 40 percent is passed through said treating zone.

3. Process in accordance with claim 1 wherein the powdered mixture contains an alkali metal bicarbonate and a non-toxic organic acid.

4. Process in accordance with claim 3 wherein the alkali metal bicarbonate is sodium bicarbonate and the acid is citric acid.

5. Process in accordance with claim 3 wherein the alkali metal bicarbonate is sodium bicarbonate and the acid is tartaric acid.

6. Process in accordance with claim 3 wherein the alkali metal bicarbonate is sodium bircarbonate and the acid is a mixture of citric acid and tartaric acid.

7. Process in accordance with claim 3 wherein the alkali metal bicarbonate is potassium bicarbonate.

8. Process in accordance with claim 3 wherein the acid is malic acid.

9. Process in accordance with claim 1 wherein the powdered mixture contains ammonium bicarbonate.

References Cited in the file of this patent

UNITED STATES PATENTS

| | | |
|---|---|---|
| 1,526,981 | Heyl | Feb. 17, 1925 |
| 1,570,086 | Schaffer | Jan. 19, 1926 |
| 1,616,587 | Little | Feb. 8, 1927 |
| 1,980,130 | Fasting | Nov. 6, 1934 |
| 2,232,145 | Shoeld | Feb. 18, 1941 |
| 2,268,816 | Gabeler et al. | Jan. 6, 1942 |
| 2,422,989 | Skoog | June 24, 1947 |
| 2,436,771 | Hood | Feb. 24, 1948 |
| 2,624,556 | Kistler | Jan. 6, 1953 |
| 2,627,457 | Kerley | Feb. 3, 1953 |
| 2,639,238 | Alther et al. | May 19, 1953 |
| 2,726,959 | Lushbough et al. | Dec. 13, 1955 |